M. H. MOFFETT.
BATTERY CASE.
APPLICATION FILED MAR. 23, 1914.
1,240,239.
Patented Sept. 18, 1917.
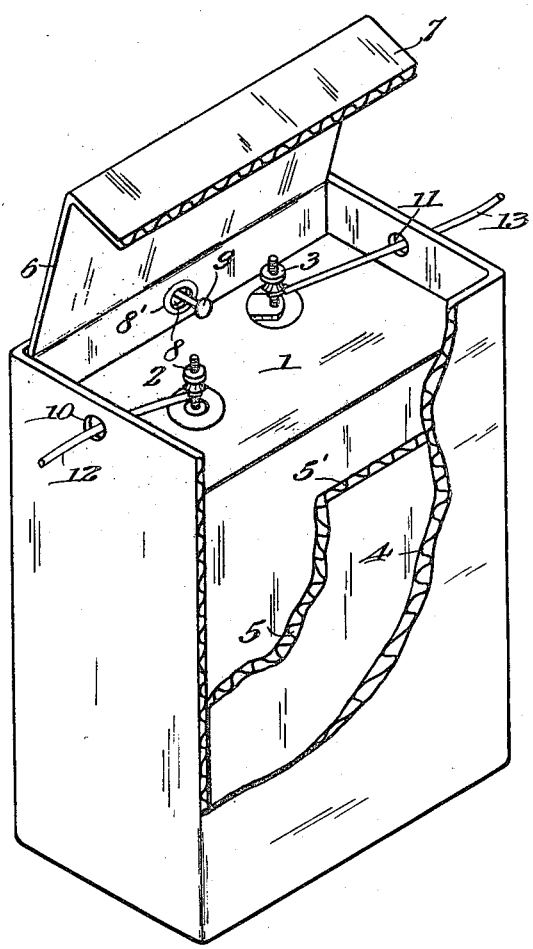
WITNESSES:
D. Brewer
H. G. Grover
INVENTOR
MARCUS H. MOFFETT
BY Ira J. Adams
ATTORNEY

UNITED STATES PATENT OFFICE.

MARCUS H. MOFFETT, OF LAKEWOOD, OHIO, ASSIGNOR, BY MESNE ASSIGNMENTS, TO NATIONAL CARBON COMPANY, INC., A CORPORATION OF NEW YORK.

BATTERY-CASE.

1,240,239.  Specification of Letters Patent.  Patented Sept. 18, 1917.

Application filed March 23, 1914. Serial No. 826,509.

*To all whom it may concern:*

Be it known that I, MARCUS H. MOFFETT, a citizen of the United States, residing at Lakewood, in the county of Cuyahoga and State of Ohio, have invented a certain new and useful Improvement in Battery-Cases, of which the following is a full, clear, and exact description.

This invention relates to an improved battery shipping case which is adapted to be used as a holder for the battery during use. In the use of dry cells for door bell operation, telephone ringing, and sundry purposes, it is customary to place the battery in an out-of-the-way place such as on shelves, ledges, overhead beams, and other inconvenient places, from which insecure lodging places they are liable to fall and cause interruption of service.

Dry batteries need to be replaced at varying periods, and it is a disagreeable task to remove the dust laden cells and install fresh ones. It is the purpose of my invention to overcome these disadvantages by providing for dry cells and other batteries a shipping case that can also be used by the purchaser as a holder for such cells when they are put in service. This case or holder protects the battery from dust, dirt and accidental short circuits and is adapted to be put in a readily accessible place where the cells can be renewed in a convenient manner. Further particulars concerning the invention will be given in the following description, reference also being made to the drawing in which;

The single figure is an isometric view, with parts broken away, of my shipping case and battery holder. In my co-pending application, Serial No. 823,945, I have described a battery jacket which is particularly adapted for use with the shipping case and holder shown and described herein, but this case is also equally useful for ordinary dry cells. This jacket 1 contains a number of batteries arranged in series or multiple and has terminals 2 and 3 projecting therefrom. The shipping case is preferably built of two parts, namely an outer casing 4 and an inner strip 5. Each of these is made preferably of double-faced corrugated strawboard, although of course other materials could be used. The outer casing is folded from a single piece of strawboard to form a rectangular box open at the top and bottom and glued or otherwise fastened at one corner. The inner strip 5 extends around the battery with one end 5' slightly below the top. The other end 6 of the strip is adapted to be closed over the battery with the flap 7 abutting against the end 5', so as to form a closure for the case as an entirety. The strip 5 is arranged in the case so that the corrugations of the two members are perpendicular to each other. If desired the two parts may be permanently fastened together by gluing, although the frictional fit is usually sufficient to hold them together. A hole 8 cut through the casing and strip in the center of the back just above the middle line of the jacket 1 provides means for conveniently supporting the battery upon a hook or nail 9. The holes 10 and 11 in the outer casing are adapted to receive the circuit wires 12 and 13 which are attached to the binding posts 2 and 3 of the battery. After the wires have been fastened to the binding posts the case may be closed and hung up. Obviously the hole 8 need not be located in exactly the position shown as it may be made in other portions of the case. However, the arrangement described is preferable.

The hole 8 may be provided with an eyelet 8' which could also serve as means for securing the parts 4 and 5 together.

It is also within the scope of my invention to score or perforate the paper where the holes are to be located so the same can be conveniently punched out by the user when the battery is put in use.

Having described my invention, what I claim is:

A combination shipping case and holder for dry batteries consisting of a double faced, corrugated outer casing open at the top and bottom, an inner casing of double faced corrugated material bent on four spaced parallel lines into rectangular form and having the junction of the ends at one of the sides of said outer casing, whereby a complete inclosure is formed when the upper flap is within the outer casing and an open ended box is formed when the flap is pulled outside the casing, the corrugation of said inner and outer casings being perpendicular to each other and said casings having an opening in the back to receive a supporting member, and said outer casing having two holes in the sides for admitting connecting wires for the purpose described.

In testimony whereof, I hereunto affix my signature.

MARCUS H. MOFFETT.

Witnesses:
 L. C. HOFFERD,
 H. G. GROVER.